Dec. 15, 1964   H. T. FAUS   3,161,056
MOISTURE INDICATOR
Filed Jan. 25, 1961   2 Sheets-Sheet 1

INVENTOR.
HAROLD T. FAUS
BY
Irving M. Freedman
HIS ATTORNEY

Dec. 15, 1964  H. T. FAUS  3,161,056
MOISTURE INDICATOR

Filed Jan. 25, 1961  2 Sheets-Sheet 2

INVENTOR.
HAROLD T. FAUS
BY
Irving M. Freedman
HIS ATTORNEY

United States Patent Office 3,161,056
Patented Dec. 15, 1964

3,161,056
MOISTURE INDICATOR
Harold T. Faus, Lynn, Mass., assignor to General Electric Company, a corporation of New York
Filed Jan. 25, 1961, Ser. No. 84,851
15 Claims. (Cl. 73—336.5)

The subject invention relates to moisture measurement, and more particularly, to an improved arrangement for directly indicating the relative humidity.

It is known to heat a saturated solution of a salt such as lithium chloride to a temperature at which the water in the solution tending to escape to the atmosphere is equal to the tendency of the salt to take on water from the atmosphere, and to utilize the temperature so derived as an indication of dew point or absolute humidity. However, it is often necessary or desirable to obtain an indication and/or electrical signal related to the relative humidity. One prior art arrangement of obtaining relative humidity has been to utilize a two-pen recorder with one pen recording dew point obtained as outlined above and the second pen recording ambient temperature. A table or chart is then utilized to correlate the two and convert the absolute humidity readings to relative humidity. However, such an arrangement is cumbersome and subject to human errors in conversion, and is unsuitable for control systems such as those associated with a dehumidifier wherein the control arrangement requires an electrical signal which varies with the relative humidity.

It is an object of this invention to provide an improved arrangement for directly indicating relative humidity.

It is another object of this invention to provide an improved circuit arrangement for deriving an electrical signal which varies with the relative humidity of the atmosphere under measurement.

Further objects and advantages of the invention will become apparent as the following dscription proceeds, and the features of novelty which characterize this invention will be pointed out with particularity in the claims annexed to and forming part of this specification.

In accordance with one form of the invention, a bridge circuit is provided for deriving an electrical signal proportional to relative humidity. The bridge circuit comprises four arms in which the first and second adjacent arms are connected together at a first junction and include an impedance which varies as the dew point of the atmosphere to which it is exposed, and a resistor which varies as the ambient temperature of the atmosphere, respectively. The third and fourth adjacent arms are connected together at a second junction and a voltage supply is connected across the third and fourth arms. An impedance which varies with the ambient temperature is provided to modify the output signal taken between the first and second junctions.

The modifying ambient temperature resistance may be connected in circuit between alternate junctions of the bridge arms, either in circuit with the output signal or in circuit with the voltage source.

For a better understanding of this invention, reference may be had to the following description taken in connection with the accompanying drawings in which.

Figure 1:
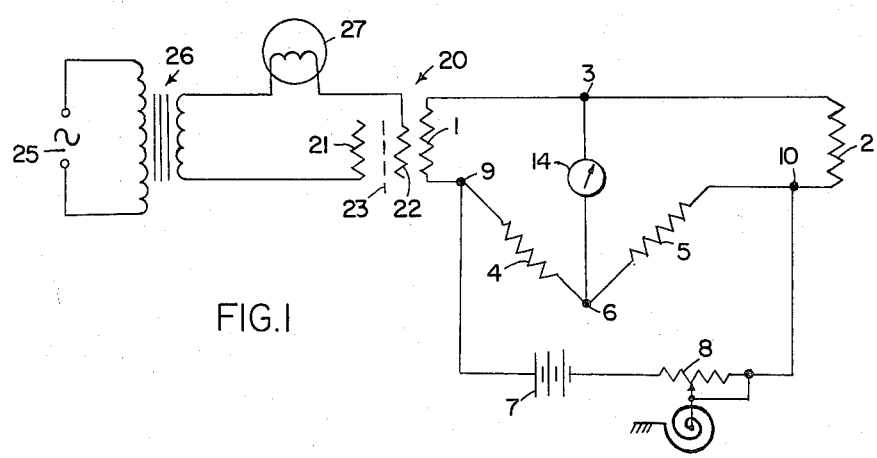
FIG. 1 illustrates a bridge circuit in schematic form embodying the invention.

Referring to FIG. 1, a bridge circuit is shown including a dew point resistor 1 in the first arm and an ambient temperature resistor 2 in an adjacent arm and which is connected to the dew point resistor 1 at junction 3. The magnitude of the dew point resistor 1 varies in accordance with the dew point as discussed below while the resistance of the ambient temperature resistor 2, which may be constructed, for example, of copper, varies in accordance with the ambient temperature. The remaining bridge arms include resistors 4 and 5, connected together at junction 6. A constant voltage D.C. source 7 in series with a temperature-controlled resistor 8 is connected across the resistors 4 and 5 to the junctions 9 and 10, which junctions are between the resistors 1 and 4 and 2 and 5, respectively.

The temperature-controlled resistor 8 comprises a variable resistor having a wiper connected to the center of a bimetallic coil and its outer end fixed relative to the wiper, such that movement of the wiper is in accordance with the differential expansion due to variations in temperature. An indicator such as a conventional moving coil, permanent magnet type of electric instrument 14 is connected between the terminals 3 and 6.

Figure 3:
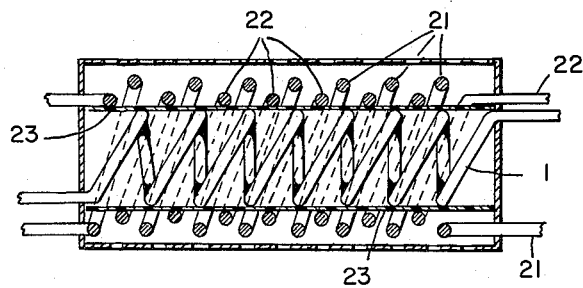
FIG. 3 is a simplified drawing showing the resistance which varies as the dew point of the atmosphere.

The dew point resistor 1 is part of a somewhat conventional lithium chloride cell 20 shown in more detail in FIG. 3. Referring to FIGS. 1 and 3, it will be seen that the lithium chloride cell includes windings 21 and 22 wound upon a woven glass tape 23 impregnated with a lithium chloride salt. The lithium chloride salt absorbs moisture from the surrounding atmosphere so as to become electrically conductive and pass an electric current. As shown in FIG. 1, a source of A.C. voltage 25 is applied through step-down transformer 26 and through current limiting ballast lamp 27 to apply a voltage between windings 21 and 22. The current which passes through the impregnated tape 23 raises the temperature of the tape causing the water in the lithium chloride solution to escape to the atmosphere until a temperature is reached where the escaping tendency of the water is equal to the tendency of the lithium chloride salt to take on water from the atmosphere. At this equilibrium point the temperature of the cell is related to the dew point or absolute humidity of the atmosphere and the temperature will vary with variations in the dew point. The dew point resistor 1 is wound around an epoxy resin form (not shown) and coated with epoxy resin and serves as a support for the tape 23 which surrounds it. The dew point resistor 1 varies in resistance with the temperature of the cell 20 such that its resistance varies with the dew point. Dew point resistor 1 may be of copper or platinum or any other temperature sensitive material while the windings 21 and 22 may be of platinum or other corrosion resistant material.

The bridge circuit utilizes the variation of the resistance of resistor 1 with dew point to provide a relative humidity indication. It has been found that the relatve humidity RH varies in the relationship $RH = t \times$ dew point depression, where $t$ varies as the ambient temperature and the dew point depression is the temperature drop necessary to cool the atmosphere from ambient to that which will form dew, or to the dew point. The bridge resistances are selected such that at any given temperature there is zero current flow through the bridge for 100% relative humidity. Resistors 4 and 5, for example, may be of equal magnitude and the dew point resistor 1 and ambient temperature resistor 2 are selected and fabricated to provide equal resistances for 100% humidity over the range of ambient temperatures to be encountered. Thus, the current differential which flows in the indicator 14 at other than 100% humidity condiitons is dependent on the difference in resistance between resistors 1 and 2 or the dew point depression as modified by variations of the temperature-controlled resistor 8.

By using a lithium chloride cell 20, the dew point resistor 1 goes through a wider temperature range than the ambient temperature resistor 2 for the same change in ambient temperature. Therefore, in order to realize a balanced condition for 100% relative humidity over the operating temperature range, it may be desirable or necessary to fabricate the dew point resistor 1 of a composite construction. For example, a portion of the dew point resistor may be of copnic, a copper nickel alloy, connected in series with the remainder of the resistor which may be of copper.

Of course, if the resistances 1 and 2 are not equal at 100% relative humidity, the resistances 4 and 5 will not be equal in order to realize bridge balance at 100% humidity which enables the use of a zero-right instrument calibrated with 100% relative humidity corresponding to zero current flow. The output thus is an electrical signal directly related to the relative humidity.

Figure 2:
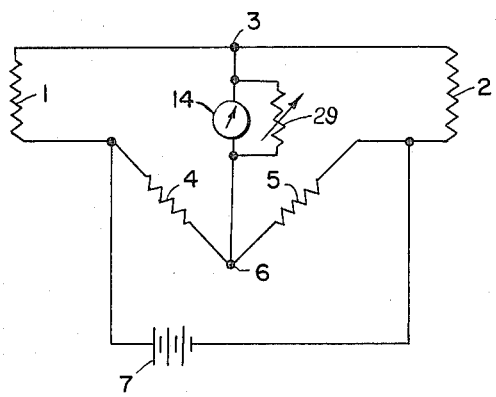
FIG. 2 is a variation of a portion of the arrangement shown in FIG. 1.

FIG. 2 is an alternate embodiment of the arrangement shown in FIG. 1 in that the ambient temperature responsive element 8 is omitted and the indicator 14 is shunted by a thermistor network 29 the resistance of which varies inversely with the ambient temperature.

Figure 4:
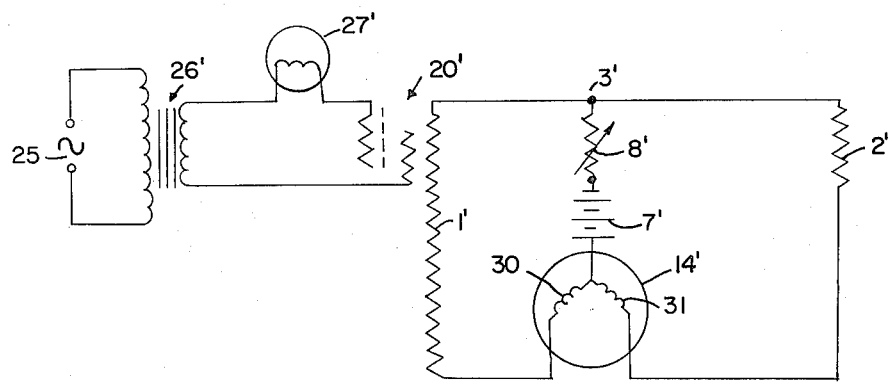
FIG. 4 is an alternate embodiment of the invention.

FIG. 4 illustrates an alternate embodiment of the invention which utilizes a differential coil type of electric instrument. Referring to FIG. 4, it will be seen that battery 7' in series with the temperature controlled resistor 8' are shunted by the dew point resistor 1' in series with one coil 30 of the differential instrument 14' and the ambient temperature resistor 2' in series with the other coil 31 of the instrument. Resistors 1' and 2' are made equal at 100% humidity and variations of humidity provide differential current flows through the coils 30 and 31 which vary as the dew point depression with the magnitude of the difference of the current flow being modified in accordance with the temperature controlled resistor 8'. The instrument 14' indicates the difference in the current flows or the relative humidity.

While particular embodiments of the subject invention have been shown and described herein, they are in the nature of description rather than limitation, and it will occur to those skilled in the art that various changes, modifications, and combinations may be made within the province of the appended claims without departing either in spirit or scope from this invention in its broader aspects.

What I claim as new and desire to secure by Letters Patent of the United States is:

1. A circuit for deriving an electrical signal proportional to the relative humidity of an atmosphere to which it is exposed comprising: four impedance arms serially connected together to form four junctions therebetween, a source of voltage connected between alternate junctions of said circuit, means to derive an output signal across the remaining junctions, an impedance which varies as the dew point temperature of the atmosphere in circuit with one arm, an impedance which varies as the ambient temperature of the atmosphere in circuit with a second arm, and additional means to vary the output signal in response to the ambient temperature to provide an electrical signal proportional to relative humidity across said remaining junctions.

2. A circuit for deriving an electrical signal proportional to the relative humidity of an atmosphere to which it is exposed comprising: four impedance arms serially connected together to form a bridge having four junctions therebetween, a source of voltage connected between alternate junctions of said bridge, means to derive an output signal across the remaining junctions, an impedance which varies as the dew point temperature of the atmosphere in circuit with one bridge arm, an impedance which varies as the ambient temperature of the atmosphere in circuit with a second arm, and additional means to vary the output signal in response to the ambient temperature to provide an electrical signal proportional to relative humidity across said remaining junctions.

3. A circuit for deriving an electrical signal proportional to the relative humidity of an atmosphere to which it is exposed comprising: four impedance arms serially connected together to form a bridge having four junctions therebetween, a source of voltage connected between alternate junctions of said bridge, means to derive an output signal across the remaining junctions, an impedance which varies as the dew point temperature of the atmosphere in circuit with one bridge arm, an impedance which varies as the ambient temperature of the atmosphere in circuit with a second arm, said impedances being such that said bridge is in balance at 100% relative humidity, and additional means to vary the output signal in response to the ambient temperature to provide an electrical signal proportional to relative humidity across said remaining junctions.

4. A circuit for deriving an electrical signal proportional to the relative humidity of an atmosphere to which it is exposed comprising: four impedance arms serially connected together to form a bridge having four junctions therebetween, a source of voltage connected between alternate junctions of said bridge, means to derive an output signal across the remaining junctions, a saturated solution cell the impedance of which varies as the dew point temperature of the atmosphere in circuit with one bridge arm, an impedance which varies as the ambient temperature of the atmosphere in circuit with a second arm, said impedances being such that said bridge is in balance at 100% relative humidity, fixed impedances in the remaining bridge arms, and additional means to vary the output signal in response to the ambient temperature to provide an electrical signal proportional to relative humidity across said remaining junctions.

5. A circuit for deriving an electrical signal proportional to the relative humidity of an atmosphere to which it is exposed comprising: four impedance arms serially connected together to form a bridge having four junctions therebetween, a source of voltage connected between alternate junctions of said bridge, means to derive an output signal across the remaining junctions, an impedance which varies as the dew point temperature of the atmosphere in circuit with one bridge arm, an impedance which varies as the ambient temperature of the atmosphere in circuit with a second arm, said impedances being such that said bridge is in balance at 100% relative humidity, and additional means to vary the output signal in response to the ambient temperature to provide an electrical signal proportional to relative humidity across said remaining junctions, said additional means comprising a variable resistor in series with said voltage which is varied in accordance with the ambient temperature.

6. A circuit for deriving an electrical signal proportional to the relative humidity of an atmosphere to which it is exposed comprising: four impedance arms serially connected together to form a bridge having four junctions therebetween, a source of voltage connected between alternate junctions of said bridge, means to derive an output signal across the remaining junctions, an impedance which varies as the dew point temperature of the atmosphere in circuit with one bridge arm, an impedance which varies as the ambient temperature of the atmosphere in circuit with a second arm, said impedances being such that said bridge is in balance at 100% relative humidity across said remaining junctions, said additional means comprising a variable resistor in shunt with said output signal which is varied in accordance with the ambient temperature.

7. A circuit for deriving an electrical signal proportional to the relative humidity of an atmosphere to which it is exposed comprising: a first impedance which varies as the dew point temperature of the atmosphere, a second impedance which varies as the ambient temperature of the atmosphere, means to provide a voltage across said impedances, means to develop an electrical output signal proportional to the differential current flows through said impedances, and means to vary the output signal in accordance with the ambient temperature, said output signal being proportional to the relative humidity of the atmosphere.

8. A circuit for deriving an electrical signal proportional to the relative humidity of an atmosphere to which it is exposed comprising: a first impedance which varies as the dew point temperature of the atmosphere, a second impedance which varies as the ambient temperature of the atmosphere, means to provide a voltage across said impedances, means to vary said voltage in accordance with the ambient temperature, and means to develop an electrical output signal proportional to the differential current flows through said impedances, said output signal being proportional to the relative humidity of the atmosphere.

9. A circuit for deriving an electrical signal proportional to the relative humidity of an atmosphere to which it is exposed comprising: a first impedance which varies as the dew point temperature of the atmosphere, a second impedance which varies as the ambient temperature of the atmosphere, means to provide a voltage across said impedances, means to vary said voltage in accordance with the ambient temperature, and means to develop an electrical output signal proportional to the differential current flows through said impedances, said last named means comprising a differential type of electric instrument having the coils thereof in series with the first and second impedance, respectively, connected across said temperature variable voltage, said output signal being proportional to the relative humidity of the atmosphere.

10. A circuit for deriving an electrical signal proportional to the relative humidity of an atmosphere to which it is exposed comprising: four impedance arms serially connected together to form four junctions therebetween, a source of voltage connected between alternate junctions of said circuit, means to derive an output signal which varies in accordance with the difference in potential across the remaining junctions, an impedance which varies as the dew point temperature of the atmosphere in circuit with one arm, an impedance which varies as the ambient temperature of the atmosphere in circuit with a second arm, and additional means to vary the output signal in response to the ambient temperature to provide a resultant electrical signal proportional to relative humidity.

11. A circuit for deriving an electrical signal proportional to the relative humidity of an atmosphere to which it is exposed comprising: four impedance arms serially connected together to form a bridge having four junctions therebetween, a source of voltage connected between alternate junctions of said bridge, means to derive an output signal which varies in accordance with the difference in potential across the remaining junctions, an impedance which varies as the dew point temperature of the atmosphere in circuit with one bridge arm, an impedance which varies as the ambient temperature of the atmosphere in circuit with a second arm, and additional means to vary the output signal in response to the ambient temperature to provide a resultant electrical signal proportional to relative humidity.

12. A circuit for deriving an electrical signal proportional to the relative humidity of an atmosphere to which it is exposed comprising: four impedance arms serially connected together to form a bridge having four junctions therebetween, a source of voltage connected between alternate junctions of said bridge, means to derive an output signal which varies in accordance with the difference in potential across the remaining junctions, an impedance which varies as the dew point temperature of the atmosphere in circuit with one bridge arm, an impedance which varies as the ambient temperature of the atmosphere in circuit with a second arm, said impedances being such that said bridge is in balance at 100% relative humidity, and additional means to vary the output signal in response to the ambient temperature to provide a resultant electrical signal proportional to relative humidity.

13. A circuit for deriving an electrical signal proportional to the relative humidity of an atmosphere to which it is exposed comprising: four impedance arms serially connected together to form a bridge having four junctions therebetween, a source of voltage connected between alternate junctions of said bridge, means to derive an output signal which varies in accordance with the difference in potential across the remaining junctions, a saturated solution cell the impedance of which varies as the dew point temperature of the atmosphere in circuit with one bridge arm, an impedance which varies as the ambient temperature of the atmosphere in circuit with a second arm, said impedances being such that said bridge is in balance at 100% relative humidity, fixed impedances in the remaining bridge arms, and additional means to vary the output signal in response to the ambient temperature to provide a resultant electrical signal proportional to relative humidity.

14. A circuit for driving an electrical signal proportional to the relative humidity of an atmosphere to which it is exposed comprising: four impedance arms serially connected together to form a bridge having four junctions therebetween, a source of voltage connected between alternate junctions of said bridge, means to derive an output signal which varies in accordance with the difference in potential across the remaining junctions, an impedance which varies as the dew point temperature of the atmosphere in circuit with one bridge arm, an impedance which varies as the ambient temperature of the atmosphere in circuit with a second arm, said impedances being such that said bridge is in balance at 100% relative humidity, and additional means to vary the output signal in response to the ambient temperature to provide a resultant electrical signal proportional to relative humidity, said additional means comprising a variable resistor in series with said voltage which is varied in accordance with the ambient temperature.

15. A system for deriving an electrical signal proportional to the relative humidity of an atmosphere to which it is exposed comprising means for generating a first signal which is proportional to the dew point temperature of the atmosphere, means for generating a second signal which is proportional to the ambient temperature of the atmosphere, means for obtaining a signal proportional to the difference between said first and second signals, and means for multiplying said difference signal by a function which is proportional to said ambient temperature to provide a resultant signal which varies as the relative humidity of the atmosphere.

References Cited in the file of this patent

UNITED STATES PATENTS

| | | |
|---|---|---|
| 2,461,310 | Cilley | Feb. 8, 1949 |
| 2,684,592 | Hadady | July 27, 1954 |
| 2,707,880 | Wannamaker | May 10, 1955 |
| 2,733,607 | Miller | Feb. 7, 1956 |
| 2,897,673 | Wylie | Aug. 4, 1959 |
| 2,966,061 | Ross | Dec. 27, 1960 |

FOREIGN PATENTS

| | | |
|---|---|---|
| 804,421 | Great Britain | Nov. 12, 1958 |